UNITED STATES PATENT OFFICE.

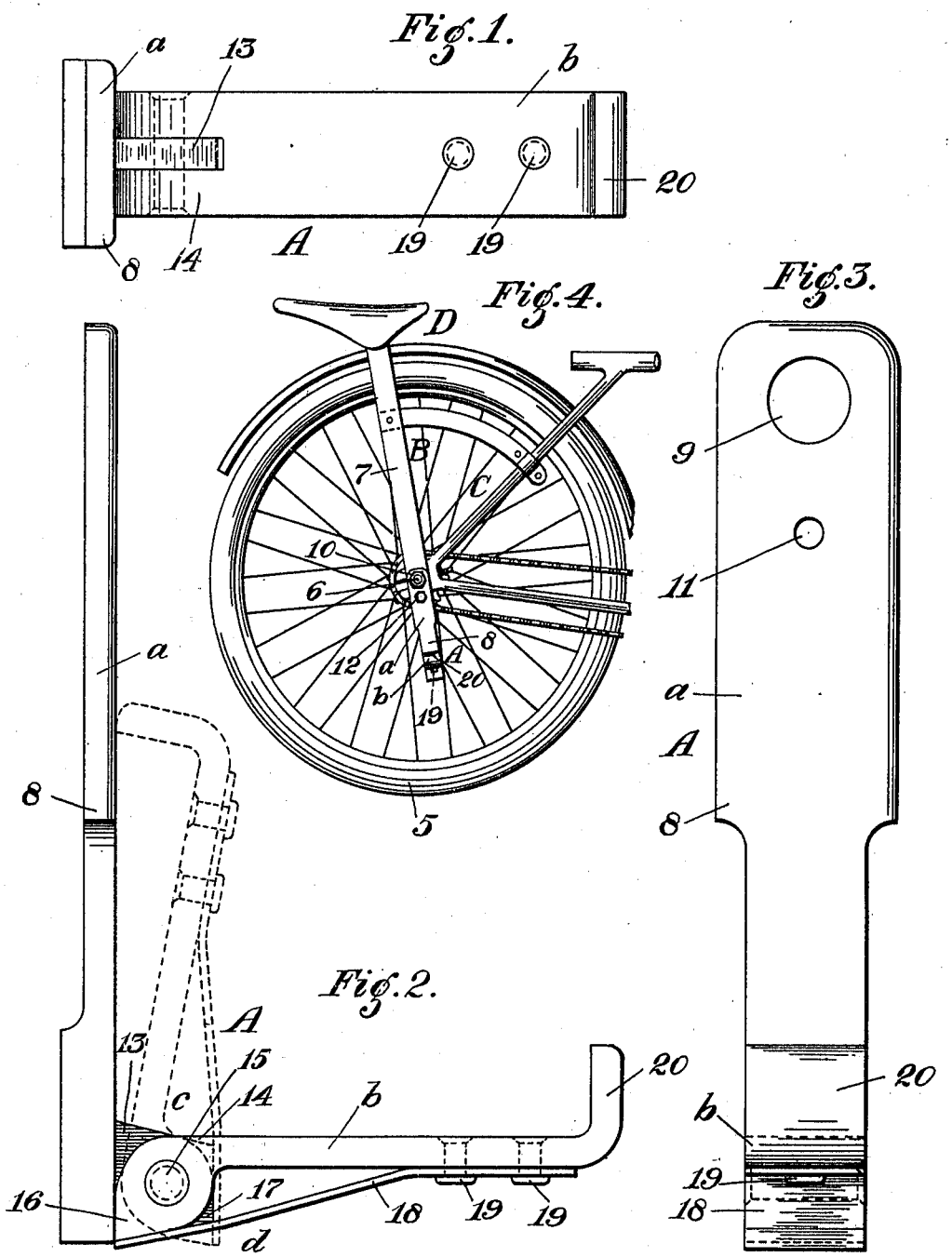

CHARLES L. STICKELBAUT, OF LOS ANGELES, CALIFORNIA.

MOTOR-CYCLE ATTACHMENT.

993,567.  Specification of Letters Patent. Patented May 30, 1911.

Application filed July 13, 1910. Serial No. 571,848.

*To all whom it may concern:*

Be it known that I, CHARLES L. STICKELBAUT, a citizen of the United States, residing at Los Angeles, in the county of Los Angeles and State of California, have invented new and useful Improvements in Motor-Cycle Attachments, of which the following is a specification.

This invention relates to motor cycle attachments; and it has for its object to provide improvements relating to the foot rests thereof, which are utilized by the person carried upon the seat of the attachment, rearward of the main seat of the vehicle.

According to present practice, it is usual to provide foot rests for motor cycle attachments which are rigidly and immovably connected with the major portion of the attachment, and which therefore constitute obstructions when the attachment is not in use, and are also liable to damage or fracture by engagement with other objects, such as other vehicles and street curbings, and the wide variety of obstacles to be encountered upon or adjacent to highways, as well as in places of storage. Furthermore, the obstructions presented by the fixed or immovable foot rests employed in usual practice materially inconvenience the operator of the motor cycle, whose position in the use of the motor cycle is forward of the attachment which holds the second rider.

It is the object of the invention to provide simple and efficient means for mounting and controlling the foot rests whereby the latter may be readily moved inwardly into position adjacent to the frame of the motor cycle, when the foot rests are not to be used; and which will conversely permit the foot rest to be conveniently and quickly projected into operative positions when required for use by the second rider who utilizes the rear seat or tandem attachment.

The invention has for its further objects to provide improvements of the character stated which will be superior in point of simplicity and inexpensiveness of construction, and positiveness of operation, and which will be generally superior in point of efficiency and serviceability.

With the above and other objects in view, the invention consists in the novel provision, formation, construction, combination, association and relative arrangement of parts, members and features, all as hereinafter described, shown in the drawings, and finally pointed out in claims.

In the drawing:—Figure 1 is a top plan view of an improved foot rest for tandem motor cycle attachments embodying the invention, the same being shown in detached position; Fig. 2 is a side elevation thereof, the parts being shown in position for service in full lines and in retracted or inoperative position in dotted lines; Fig. 3 is an outer end elevation thereof; and, Fig. 4 is a side elevation of a portion of a motor cycle illustrating the application of the improved foot rests constituting the invention, to a tandem attachment connected with the motor cycle.

Corresponding parts in all the figures are denoted by the same reference characters.

Referring with particularity to the drawing, A denotes the improved foot rest embodying the invention, the same being shown upon a diminished scale in Fig. 4, as applied to and made part of a motor cycle attachment B connected with the frame C of the motor cycle and provided with a seat D for a second rider, whereby the motor cycle may be ridden tandem fashion; the attachment B being located at the rearward end of the frame C which is provided with a rear wheel 5 and its axle 6. The foot rest A when connected with the attachment B, so that it forms a part or member thereof, depends from said attachment and the axle 6 with which the attachment is connected. It is to be understood that there are two of the foot rests, one at each side of the motor cycle and connected with an upright member, as 7, of the attachment B, and forming a downwardly ranging extension thereof.

Each of the foot rests A comprises a hanger *a* and a step body *b*, the same being united by connection means *c* which permits relative play thereof; holding means *d*, preferably tensional, being provided for maintaining the step body *b* in withdrawn or inoperative position, as shown in Fig. 2.

The hanger *a* in a preferred form of construction and formation of parts as now about to be recited, comprises a flat bar 8 provided adjacent to its upper end with a transverse hole 9 which receives the outer end of the axle 6 of the rear wheel; a nut 10 being applied to such axle end after its passage through the hole 9, as shown in Fig. 4. Below the hole 9 is provided a supplementary hole 11, which receives a nut and bolt 12, as shown in Fig. 4, whereby the bar 8 is supplementarily connected with the frame member 7 beneath the axle 6; said hanger thus having main and supplemental securing means for attaching the same firmly to the attachment B. At the lower end of the bar 8 is provided a flat head 13, which projects from one face thereof; and the inner bifurcated end portion 14 of the step body $b$ straddles the head 13 and is pivotally connected therewith by the connection means $c$ which consists of a pin 15 passed through the step body and the head 13 and headed at its ends in countersunk portions of the step body. The step body terminates at its inner end in a flat facial portion 16 formed to act as a stop bearing against the hanger bar 8 when the step body is projected therefrom substantially at right angles; and the outer face of the head 13 has a flat superficial facial portion 17 constituting a stop which co-acts with the holding means $d$, which latter may consist of a leaf spring 18 connected at one end, as at 19, with and beneath the stop body $b$, adjacent to the outer end thereof and bearing at its other end against the inner end of the step body adjacent to the point of pivotal support of the same. The step body is maintained in operative or extended or lowered position by the engagement of the stop 16 with the hanger bar 8; and the step body is maintained in withdrawn or inoperative position by the engagement of the inner end of the spring 18 with the flat face of the stop 17, which engagement is caused when the step body is swung upwardly upon the pivot 15, as shown in dotted lines in Fig. 2. Very slight pressure downwardly upon the step body is all that is necessary to cause the spring 18 to ride over the lower edge of the stop 17 as the step body is depressed to operative position. The outer end of the step body may be provided with a rectangularly directed nose 20, serving to confine the foot of the user to proper position upon the step body.

It will be noted that when the step body is swung inwardly and upwardly upon the connection means $c$, the same is withdrawn from laterally projecting position into a position substantially within the plane of the attachment B which is the plane of the frame of the vehicle. The foot rest therefore ceases to be an obstruction, interfering with the operator of the motor cycle, or being subject to damage or fracture either of itself or of other objects or articles.

I do not wish to be understood as limiting myself to the particular construction, formation, arrangement, and operation set forth and disclosed; but reserve the right to vary the same within the proper scope of the invention.

Having thus described my invention, I claim and desire to secure by Letters Patent:—

1. A motor cycle attachment comprising a hanger, a head projecting from the hanger, a step body pivotally connected with the head, a stop limiting movement of the step body in one direction, and a spring connected with the step body and co-acting with the head to maintain the step body in unstopped position.

2. A motor cycle attachment, comprising a hanger, a head projecting from the hanger, a step body provided with a bifurcated portion embracing and pivotally connected with the head, the inner end of the step body being formed into a stop co-acting with the hanger to maintain the step body in depressed position, and a spring connected with the step body and co-acting with the head to maintain the step body in elevated position.

In testimony whereof, I have signed my name to this specification in the presence of two subscribing witnesses.

CHARLES L. STICKELBAUT.

Witnesses:
FRIEDA A. STICKELBAUT,
CAL. F. HUNTER.